United States Patent [19]

Rusakova et al.

[11] 3,880,731

[45] Apr. 29, 1975

[54] METHOD FOR PREPARING ALIPHATIC HYDROXY ACIDS

[76] Inventors: Marina Savvatievna Rusakova, ulitsa Furmanova, 1, kv. 35; Valeria Alexandrovna Podgornova, ulitsa Titova, 16, kv. 9; Vitaly Nikolaevich Kreitsberg, prospekt Lenina, 53, kv. 42; Boris Fedorovich Ustavschikov, ulitsa Tolbukhina, 40, kv. 44; Mark Iosifovich Farberov, prospekt Oktyabrya 39, kv. 7, all of Yoroslavl; Yakov Iosifovich Turyan, ulitsa Sverdlova, 44, kv. 97, Krasnodar; Evgeny Pavlovich Shvyrkov, ulitsa Chkalova, 49, kv. 68, Yaroslavl, all of U.S.S.R.

[22] Filed: May 29, 1973

[21] Appl. No.: 364,402

[52] U.S. Cl............. 204/74; 204/73 R; 260/535 R
[51] Int. Cl.. C07b 29/06; C07c 29/00; C07c 59/04
[58] Field of Search........... 260/535, 535 R; 204/72, 204/73 R, 74

[56] References Cited
UNITED STATES PATENTS
3,715,394  2/1973  Boichard et al................. 260/535 R

FOREIGN PATENTS OR APPLICATIONS
1,121,207  7/1968  United Kingdom............ 260/535 R
1,196,181  7/1965  Germany........................ 260/535 R
143,388    3/1961  U.S.S.R........................... 260/535 R Primary Examiner—F. C. Edmundson

[57] ABSTRACT

The method for preparing aliphatic $\alpha$-hydroxy acids consists in oxidation of $\alpha$-olefins by liquid nitrogen tetraoxide, at the ratio of the reagents of 1:3-5, respectively, at a temperature of 15°–20°C with formation of $\alpha$-nitrato acids, in removal of excessive quantities of nitrogen tetraoxide, and electrochemical reduction of $\alpha$-nitrato acids in an electrolyzer provided with a diaphragm.

The proposed method ensures the preparation of the end product with its simultaneous isolation, which significantly simplifies the process flowsheet and removes side processes of oxidation of the end product. The method provides the conditions for preparing sufficiently pure product at high yields.

5 Claims, No Drawings

METHOD FOR PREPARING ALIPHATIC HYDROXY ACIDS

This invention relates to the method for preparing aliphatic α-hydroxy acids.

Said aliphatic α-hydroxy acids (α-hydroxypropionic acid, α-hydroxyisobutyric acid, etc.) are valuable products widely used in various branches of modern industry, viz., as preservatives of foods, tanning agents, pharmaceuticals, substitutes of natural oils in preparing lacquers and varnishes, in basic organic synthesis for preparing other valuable compounds.

Alpha-hydroxypropionic, or lactic acid, is the most popular of the α-hydroxy acids, which is widely used as a preservative in preparing fodder.

Derivatives of lactic acid are also widely used. For example, its esters are used as solvents, and its salts are used for preparing catalysts in the manufacture of ethylene oxide.

Alpha-hydroxy acids are the raw material for preparing monomers of the acrylic series (acrylic acid proper, metacrylic acid, their esters, etc.).

Known in the prior art are many methods for preparing alpha-hydroxy acids. The main difficulty consists in the isolation of alpha-hydroxy acids in a pure form from the reaction mixture, containing nitric acid and water, since the known techniques, for example, extraction, are difficult to apply because of the great solubility in water of alpha-hydroxy acids.

During rectification of these mixtures, the main product is decomposed owing to its low stability in oxidizing media.

Known are methods for preparing lactic and α-hydroxyisobutyric acids by oxidizing α-olefins by liquid nitrogen tetraoxide (or a mixture of liquid nitrogen tetraoxide and nitric acid). In these methods, the reaction proceeds in a reaction kettle into which liquid nitrogen tetraoxide (or a mixture of nitrogen tetraoxide and nitric acid) is loaded and gaseous propylene or isobutylene is passed thereinto. The reaction is carried out at a temperature of 15°–20°C with a molar ratio of olefin to $N_2O_4$ of 1:3–5. When the above mixture is used, the ratio of $N_2O_4$ is 1:3 – 5:1.

As a result of the reaction, a mixture is formed, containing mainly α-nitrato acids, which are compounds of the general formula $RCH(NO_2)COOH$ where R is an alkyl, the yield being 85 – 95 per cent with respect to the reacted olefin. Excess nitogen tetraoxide is then removed from the reaction mixture, condensed and returned into the process.

After removal of nitrogen tetraoxide, the reaction product is delivered into an apparatus where α-nitrato acids are hydrolyzed in an aqueous medium at a temperature of about 100°C. Nitric acid contained in the reaction product (in case of synthesizing alpha-hydroxyisobutyric acid) is used as the catalyst in the hydrolysis (cf. USSR Inventor's Certificate No. 192,779, 1966). Hydrochloric acid or a cation-exchange resin (sulphonated copolymer of divinylbenzene and styrene) is used as catalyst in the preparation of lactic acid (cf. USSR Inventor's Certificate No. 180,180, 1966). The yield of alpha-hydroxy acids in the hydrolysis is about 80 per cent.

The main disadvantage of this process is the difficult isolation of α-hydroxy acids from the hydrolyzate, since during hydrolysis of α-nitrato acids into α-hydroxy acids, use is made of mineral acids under the action of which side reactions take place, namely, α-hydroxy acids (lactic acid in particular) are readily oxidized to oxalic and acetic acids, and the process of self-esterification into polyacids, into polylactic acid in particular, takes place.

Moreover, the use of hydrochloric acid, which binds nitric acid, results in the formation of nitrosyl chloride which deteriorates the end product.

All this decreases the yield of the end product and involves complicated process equipment.

The object of this invention is to work out a method for preparing aliphatic alpha-hydroxy acids by a simple process at a high yield of the end product of sufficiently high purity.

In accordance with these and other objects, the invention consists in that alpha-olefins are oxidized by liquid nitrogen tetraoxide, with the ratio of the reagents of 1:3–5 respectively, at a temperature of 15°–20°C, with the formation of α-nitrato acids, removal of excess nitrogen tetraoxide with subsequent processing of the α-nitrato acids to the formation of the end product. According to the invention, α-nitrato acids are reduced in an electrolytic cell by the electrochemical method in an electrolytic cell provided with a diaphragm.

Owing to the use of the electrochemical reduction of α-nitrato acids, the process is highly selective in the direction of formation of the end product.

Moreover, the side reaction of oxidation of the end product is suppressed, since nitric acid which reacts with the end product is concentrated in the anode space on account of migration under the action of the potential gradient.

Thus, the proposed method, as compared with the known method, ensures the preparation of the end product by a simplified process, since no additional steps are required to isolate the end product.

The proposed method eliminates the side processes in which the end product is oxidized, which fact ensures sufficiently high purity of the end product at a higher yield. Furthermore, nitric acid which is formed at the stage of electric reduction, can be utilized for other purposes.

The proposed method is realized as follows.

Liquid nitrogen tetraoxide is loaded into a reaction kettle and cooled to −10°C, after which, into the lower part of the reactor, gaseous olefin is slowly introduced. The molar ratio of olefin to nitrogen tetraoxide is 1:3–5. The reaction is carried out at a temperature of 15°–20°C. As soon as the reaction is completed, excessive quantities of nitrogen tetraoxide are removed by heating the mixture to 40°C. For complete removal of nitrogen tetraoxide from the reaction mixture, air is passed through it at a rate of 30 litres per hour. Excess nitrogen tetraoxide is condensed and reused in the process at the stage of oxidation.

After removal of excess nitrogen tetraoxide from the reaction mixture, it is either processed to isolate α-nitrato acids by any known method, for example, by rectification, with subsequent reduction, or is immediately delivered into the cathode space of a two-chamber electrolytic cell for electrochemical reduction.

In order to increase the electrical conductivity of the solution, it is preferred to adjust the concentration of α-nitrato acids to 20 – 40 per cent by weight by diluting them with water. The anode space is filled with dilute nitric acid. Antimony, graphite, niobium, tantalum, platinum, mercury, titanium, etc., can be used as the cathode. The preferable cathode is mercury, platinum and titanium.

The anode is platinum. Acid-resistant ceramic, porous glass, and ionite membranes are used as the diaphragms.

The potential of the cathode is maintained at 0.8 ± 0.2V relative to the saturated calomel electrode.

The electrochemical reduction results in α-hydroxy acid with a yield of 90 - 98 per cent. Wherever necessary, α-hydroxy acid is purified by any known technique, for example, by rectification.

For a better understanding of the invention, the following examples of its practical embodiment are given by way of illustration.

EXAMPLE 1

1.61 mole (148 g) of liquid nitrogen tetraoxide is placed into a reactor and cooled to −10°C. Then, at a slow rate (for 3 hours), 0.31 mole (13.05 g) of gaseous propylene is passed into it. The reaction temperature is maintained at 15°-20°C. On the termination of the reaction, the mixture is heated to 40°C to remove excess nitrogen tetraoxide. To ensure complete removal of nitrogen tetraoxide, dry air is passed through the reaction mixture at a rate of 30 litres per hour.

After removal of nitrogen tetraoxide, the remaining mixture (54.25 g) contains αnitratopropionic acid which is separated by vacuum fractionation. As a result, 35.6 g of α-nitratopropionic acid are prepared, which is 85 per cent of theory.

5.15 g of the prepared α-nitratopropionic acid are dissolved in 50 ml of a 0.06N nitric acid taken in the capacity of electrolyte to ensure the passage of electric current through the solution and to suppress the dissociation of α-nitrato acid. The obtained solution is placed into the cathode space of the electrolytic cell with a mercury cathode and a platinum anode, separated by a diaphragm of porous glass. 0.06N nitric acid is poured into the anode space. The cathode potential is maintained at −0.8 ± 0.2V with respect to the calomel electrode. Nitric acid is concentrated in the anode space during the electrolysis.

3.37 g of α-hydroxypropionic acid are prepared as a result. The yield is 98 per cent with respect to the reacted α-nitratopropionic acid. The yield with respect to the current is 80 per cent.

EXAMPLE 2

8.5 moles (790 g) of liquid nitrogen tetraoxide are placed into the reaction vessel and cooled to −5°C. Then, slowly, for 8 hours, 2.8 moles (109.5 g) of gaseous propylene are passed into it. The reaction temperature is maintained at 15° - 20°C. On the termination of the process, excess quantities of nitrogen tetraoxide are removed by a procedure similar to that described in Example 1. After removal of the nitrogen tetraoxide, the reaction mixture (440 g) is diluted with water (1,400 ml) and the unreacted oil (5.0 g) is separated.

The aqueous solution containing 344 g of α-nitratopropionic acid is placed into the cathode space of the electrolyzer with a titanium cathode and platinum anode separated by a diaphragm of porous acid-resistant ceramic (the pore diameter not above 8 microns). The potential of the cathode is maintained at −0.8 ± 0.2V relative to the saturated calomel electrode. Nitric acid is concentrated in this process in the anode space.

220 g of α-hydroxypropionic acid are obtained. The yield with respect to the reacted α-nitratopropionic acid is 96 per cent. The yield with respect to the passed current is 80 per cent.

EXAMPLE 3

1.61 mole (148 g) of liquid nitrogen tetraoxide is placed into the reaction flask and cooled to −10°C. Gaseous propylene is slowly passed through it for three hours (0.4 mole or 16.8 g). Excessive nitrogen tetraoxide is removed by passing dry air through the reaction mixture. The remainder (about 69.2 g) containing 51.4 g of α-nitratopropionic acid (the yield is about 95 per cent) is diluted with water and, as a 40 per cent aqueous solution containing about 1.5 per cent of HNO$_3$, it is reduced by a procedure similar to that described in Example 2.

The resultant product is 44 g of lactic acid in the form of an aqueous solution. The yield is 95 per cent. The yield with respect to current is about 80 per cent.

EXAMPLE 4

2.3 moles (212 g) of liquid nitrogen tetraoxide are poured into a reaction vessel and cooled to −10°C, after which, slowly, for 4 hours, gaseous isobutylene (0.6 mole) is passed into it. The reaction temperature is maintained at 15° - 20°C. Excess nitrogen tetraoxide is removed by a procedure similar to that described in Example 1. After removal of nitrogen tetraoxide, the product is kept at a temperature of 20° - 25°C for 12 hours. The precipitated crystals of α-nitratoisobutyric acid (85 g) are separated by filtration. The yield of α-nitratoisobutyric acid is 95 per cent.

85 g of α-nitratoisobutyric acid are dissolved in 300 ml of water and the solution is placed into the cathode space of the electrolytic cell with a platinum cathode and a platinum anode, separated by an ion-exchange diaphragm. The potential on the cathode is maintained at −0.8 ± 0.2V relative to the saturated calomel electrode.

Obtained are 56 g of α-hydroxyisobutyric acid. The yield with respect to the reacted α-nitratoisobutyric acid is 95 per cent. The yield with respect to the passed current is 80 per cent.

EXAMPLE 5

3 moles (276 g) of liquid nitrogen tetraoxide are loaded into a reaction flask and cooled to −10°C. Then, gaseous isobutylene is slowly passed through it for 4 hours. The reaction temperature is maintained at 15°-20°C. The quantity of passed isobutylene is 0.6 mole (33.6 g). The concentration of the gas is 99 per cent. Excess nitrogen tetraoxide is removed by passing dry air through the reaction mixture. The remainder (103 g) is kept at room temperature for 12 hours. It contains 86 g of α-nitratoisobutyric acid (the yield is 96 per cent).

The prepared product (containing about 1.5 per cent of HNO$_3$ and 40 per cent of α-nitratoisobutyric acid) is dissolved in water and placed in an electrolytic cell, where it is reduced by the procedure described in Example 4. The prepared 57.6 g of α-hydroxyisobutyric acid is in the form of an aqueous solution. The yield is 98 per cent. The yield with respect to current is about 80 per cent.

EXAMPLE 6

1.2 mole (110 g) of liquid nitrogen tetraoxide is placed in a reactor and cooled to −10°C. Then, 0.2 mole of gaseous α-butylene is passed slowly into it. The reaction temperature is 15° – 20°C. On the termination of the reaction, the obtained mixture is heated to 40°C to remove excess quantities of nitrogen tetraoxide by a procedure similar to that described in Example 1. The remainder (24 g) contains 19.2 g of α-nitratobutyric acid which is 64 per cent with respect to the passed α-butylene.

24 g of the reaction mixture are dissolved in 100 ml of water and non-dissolved oil is separated (1.0 g).

An aqueous solution containing 19.2 g of α-nitratobutyric acid is placed into the cathode space of the electrolytic cell having a titanium cathode and a platinum anode separated by a diaphragm of porous ceramic (the pore diameter not above 8 microns). The potential is maintained at −0.8 ± 0.2V relative to the saturated calomel electrode.

Obtained are 12.3 g of α-nydroxybutyric acid. The yield is 95 per cent with respect to the reacted α-nitratobutyric acid. The yield with respect to current is 80 per cent.

EXAMPLE 7

1.2 mole (110 g) of liquid nitrogen tetraoxide are loaded into a reaction flask and 0.3 mole (16.8 g, concentration 97 per cent) of butene-1 is passed. The reaction temperature is maintained at 15° – 20°C. Excess quantities of nitrogen tetraoxide are removed by passing dry air through the reaction mixture. The remaining 36 g are poured into water and α-nitratobutyric acid is extracted by diethyl ether. After distillation of the ether in vacuum, pure α-nitratobutyric acid is obtained (b.p. 102° – 103°C at 2 – 3 mm Hg). The yield is of α-nitratobutyric acid is about 80 per cent.

10 g of α-nitratobutyric acid, in the form of a 20 per cent aqueous solution, and 2 per cent of nitric acid are placed into an electrolytic cell and reduced as described in Example 6. The resultant product is 6.6 g of aqueous solution of α-hydroxybutyric acid. The yield of the acid is 95 per cent. The yield with respect to current is about 80 per cent.

EXAMPLE 8

1.63 mole (150 g) of liquid nitrogen tetraoxide is placed into a reactor and cooled to −10°C, after which 0.51 mole (35.6 g) of gaseous pentene-1 is passed into it. The reaction temperature is maintained at 15° – 20°C. On the termination of the reaction, the obtained mixture is heated to 40°C to remove excess quantities of nitrogen tetraoxide as described in Example 1. The remainder (114 g) contains 83 g of α-nitratovaleric acid, which is isolated by a procedure similar to that described in Example 7.

The aqueous solution containing 16.3 g of α-nitratovaleric acid and 2 per cent of $HNO_3$ is placed into the cathode space of an electrolytic cell with a titanium cathode and a platinum anode, separated by a diaphragm of porous ceramic (pore diameter not above 8 microns). The potential is maintained at −0.8 ± 0.2V relative to the saturated calomel electrode. Obtained are 11.3 g of α-hydroxyvaleric acid. The yield is 96 per cent with respect to the reacted α-nitratovaleric acid. The yield with respect to current is 80 per cent.

What we claim is:

1. A process for preparing aliphatic α-hydroxy acids comprising electrolyzing aliphatic α-nitrato carboxylic acids in aqueous solution in the cathode compartment of an electrolytic cell having anode and cathode compartments separated by a diaphragm at a cathode potential of −0.6 to −1.0 volts relative to the saturated calomel electrode.

2. A process according to claim 1 wherein the concentration of α-nitrato acid in the aqueous solution is within the range 20–40% by weight.

3. A process according to claim 1 wherein said aqueous solution is 0.06 N in nitric acid.

4. A process according to claim 1 wherein the electrolysis is conducted at room temperature.

5. A process according to claim 1 wherein said α-nitrato acid is prepared by oxidizing and α-olefin with liquid nitrogen tetraoxide in the molar ratio of 1 mole of α-olefin to 3–5 moles of nitrogen tetraoxide at a temperature of 15°–20°C.

* * * * *